United States Patent [19]

Kaul et al.

[11] 4,054,753
[45] Oct. 18, 1977

[54] DOUBLE SYNC BURST TDMA SYSTEM

[75] Inventors: Pradman Kaul, Gaithersburg; Ova Gene Gabbard, Germantown, both of Md.; John M. Husted, Vienna, Va.

[73] Assignee: Digital Communications Corporation, Gaithersburg, Md.

[21] Appl. No.: 624,093

[22] Filed: Oct. 20, 1975

[51] Int. Cl.$^2$ ............................................. H04J 3/06
[52] U.S. Cl. ................................. 179/15 BS; 325/4
[58] Field of Search ................ 179/15 BS; 325/4; 178/69.5 R

[56] References Cited

U.S. PATENT DOCUMENTS

| | | | |
|---|---|---|---|
| 3,761,814 | 9/1973 | Bernasconi | 325/4 |
| 3,838,221 | 9/1974 | Schmidt | 179/15 BS |
| 3,878,339 | 4/1975 | Maillet | 179/15 BS |

Primary Examiner—David L. Stewart
Attorney, Agent, or Firm—Pollock, Vande Sande & Priddy

[57] ABSTRACT

A TDMA system in which each station times its respective data burst from a reference sync burst transmitted by a designated primary reference station over the satellite link. Another station transmits a secondary sync burst timed from the primary stations sync burst. To maintain synchronism at the satellite each station has a burst synchronizer operated by receipt of the primary reference sync burst. The secondary sync burst is also received by each of the stations and is capable of ensuring synchronization in case of failure of the primary stations's sync burst.

26 Claims, 9 Drawing Figures

Aperture Generator

Preamble Detector

Burst Synchronizer

Preamble Generator

Preamble Generator

Aperture Generator

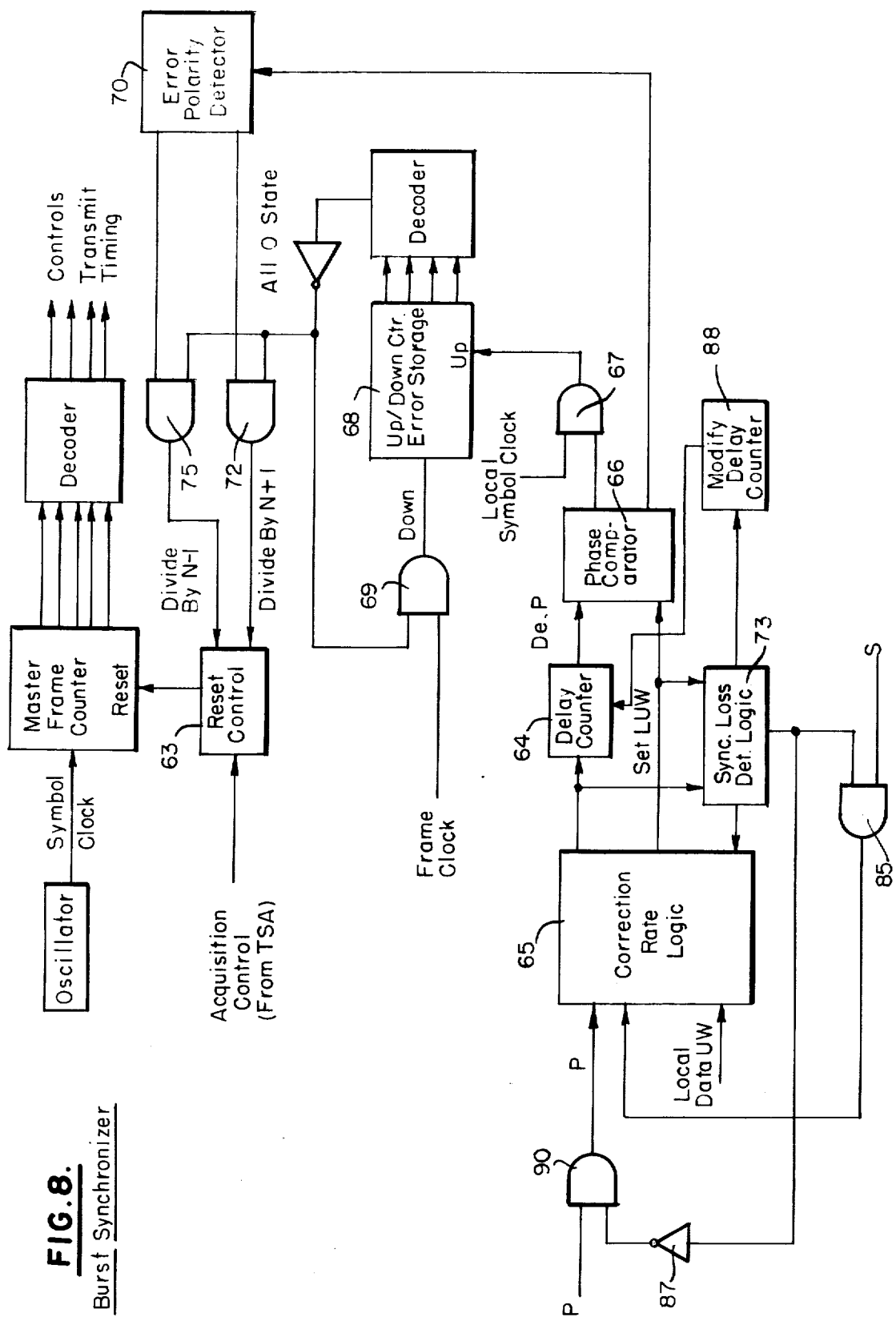
FIG. 8. Burst Synchronizer

DOUBLE SYNC BURST TDMA SYSTEM

FIELD OF THE INVENTION

This invention relates to synchronization apparatus for TDMA systems.

BACKGROUND OF THE INVENTION

In the last few years a number of satellite communication systems have been proposed, built and operated. A particular variety of satellite communication systems which has proved to be economically attractive employs time division multiple access (TDMA). In this system the plurality of earth stations transmit information in burst form (i.e., data bursts) to the satellite for re-transmission to other earth stations. In order to allow a plurality of earth stations to transmit substantially simultaneously, the system is designed to allow each of the transmitting earth stations to transmit in a predetermined period of time such that the respective transmissions will be received in the sequential relationship at the satellite. So long as the respective transmissions are so received effective communication is achieved inasmuch as the satellite then retransmits the information it receives to other earth stations. An essential requirement for TDMA systems is proper synchronization. Loss of synchronization can, and generally will result in transmissions which overlap in time at the satellite. Those of ordinary skill in the art will understand that such a condition will result in garbling of the overlapping transmissions and render the satellite unable to retransmit the information transmitted to it.

In order to synchronize the TDMA systems a single station is designated as a reference station and, in addition to transmitting whatever information it has to transmit, it also transmits a synchronization signal, or sync burst. This sync burst is received at the satellite and retransmitted to all other stations in the same manner as the information received by the satellite is transmitted. Receipt at any earth station of the sync burst allows that station to time its transmission from the sync burst for proper synchronization. A typical example of such a synchronization system is disclosed in Gabbard U.S. Pat. No. 3,562,432. As indicated in that patent proper synchronization is so important that if, at any station, the synchronization burst is not received for "a predetermined time, the station transmitter is automatically disabled to prevent jamming of other bursts".

Of course, there are a number of reasons why a particular earth station will fail to receive the sync burst. If the failure to receive the sync burst is related to a failure at the receiving station then the action taken, i.e., shutting down the receiving stations transmitter, is the most effective action that can be taken to overcome the problem. This possibility is usually remote since the majority of satellite terminals have redundant equipment to minimize such instances. In addition at least one reason for failing to receive the sync burst is that the station transmitting the sync burst has failed to transmit it. If this occurs, of course, each of the stations in the communication system will fail to receive the sync burst and, therefore, each of them will be automatically shut down thereby disabling the entire system. Obviously, this is not a desirable alternative.

Maillet, in U.S. Pat. No. 3,878,339 proposes another alternative to the just mentioned situation. In this apparatus each of the stations monitor their reception of the sync burst. If the apparatus indicates that the sync burst is lost each station begins timing out a preset period. Furthermore, each station receives an indication, from each of the other stations, as to whether or not that other station has also lost the sync burst. If a majority of the stations are indicating a loss of sync burst for the predetermined period of time, then a predetermined one of the remaining stations will then put up a new sync burst. The reason for requiring a plurality of stations to agree on loss of sync burst should be apparent, i.e., to prevent this possibility that a local failure has caused a loss of sync burst indication when, in fact, the reference station is transmitting the sync burst. If that condition is not prevented, it is likely that two stations would put up a sync burst at different times which could result in confusion and prevent effective operation. Inasmuch as the stations are geographically widely separated and in order to provide each station with an indication of whether or not each of the other stations is receiving the sync burst, a signalling channel must be provided between the stations for this purpose.

Although there is no reason to believe that this system would not work, it should be apparent that use of this system will decrease efficiency by requiring a channel so that each station can indicate to each of the other stations whether or not it is receiving the sync burst. Futhermore, additional apparatus is required to detect reception of the sync burst and provide for a proper signalling, to receive other station signalling and to perform the necessary logical operations inherent in employing this system. Furthermore, this system requires that the network operate without a reference sync burst during the replacement cycle for intervals greater than one round trip satellite propagation delays. This requirement places severe constraints on stability and absolute accuracy of satellite terminal frequency standards.

It is therefore one object of the present invention to provide a synchronization system which is effective to maintain synchronization in a TDMA system notwithstanding failure of the reference station sync burst. It is another object of the present invention to provide for synchronization in a TDMA system which does not require a signalling channel dedicated to transmission of information respecting each stations reception of the reference sync burst. A still other object of the present invention is to provide for synchronization in a TDMA system which does not require significant additional hardware in order to maintain synchronization even in the presence of failure of the reference sync burst. A further object of the present invention is to provide for synchronization in a TDMA system which is extremely simple and yet effective to automatically maintain synchronization in the presence of failure of the reference sync burst.

SUMMARY OF THE INVENTION

The present invention meets these and other objectives by providing for transmission of a secondary sync burst in addition to the reference sync burst. A secondary sync burst is transmitted by a station other than the station which transmits the reference sync burst. Both the reference and secondary sync burst are present in the system time frame and both are received by each of the stations in the system. The secondary sync burst is used to preset a counter included in the synchronization system at each terminal and the reference sync burst is used to reset the same counter. The counter which is preset and reset by the secondary and reference sync burst is the counter in the synchronization system which controls the transmission time for the station. When the reference sync burst is received the timing of the secondary sync burst has no effect on the counter since it is reset by the reference sync burst subsequent to the time it is preset by the secondary sync burst. On the other hand, when the reference sync burst is absent, the station will, in effect, time its transmissions from the secondary sync burst. In this fashion synchronization is automatically maintained without requiring additional logical equipment and without taking up an information channel.

The stations which are to send out the reference sync burst and secondary sync burst are predetermined. The station sending out the secondary sync burst times the sync burst in relation to the reference sync burst. Of course, when the reference sync burst fails, the station which is transmitting the secondary sync burst will not receive the reference sync burst. In that event the station which is sending the secondary sync burst becomes, in effect, the reference station.

BRIEF DESCRIPTION OF THE DRAWINGS

This invention will now be disclosed in this specification taken in conjunction with the attached drawings in which like reference characters identify identical apparatus, and in which:

FIG. 8 is a block diagram of another embodiment of a burst synchronizer.

DETAILED DESCRIPTION OF THE INVENTION

Figure 1:
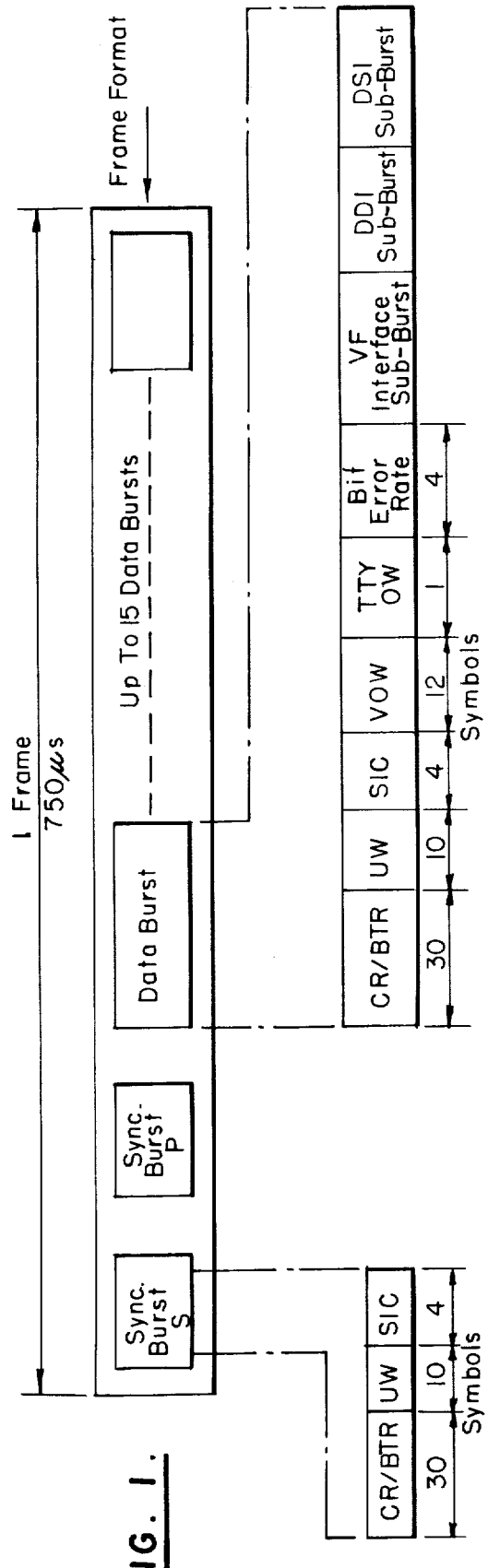
FIG. 1 illustrates a typical frame.

In order to provide a setting in which the operation of this invention can be understood we will first describe a TDMA system in which the inventive apparatus and method can be used. FIG. 1 illustrates a typical frame. Those skilled in the art understand that the frame is a representation of a time sequence of transmitted signals showing the manner in which transmissions from each of the stations are received at the satellite. FIG. 1 shows that the frame is comprised of a pair of sync bursts, sync burst S and sync burst P and a plurality of data bursts; FIG. 1 illustrating as exemplary up to 15 data bursts. In an exemplary embodiment the frame period can comprise 750 microseconds as is illustrated in FIG. 1. Each of the data bursts is identical in format, and a typical data burst is illustrated in detail in FIG. 1 as comprising a plurality of portions including CR/BTR, UW, SIC, VOW, TTY, OW, BER, VFI, DDI and DSI. The initial portion of the data burst comprises a predetermined time period for carrier recovery and bit timing recovery (CR/BTR), which are functions well known to those skilled in the art. The next portion of the burst comprises a unique word (UW) which identifies the beginning of the burst. The SIC refers to the station identificaton code, which identifies the station which is transmitting. The remaining portions of the burst comprise different data channels of different types, or formats such as a voice order wire, teletype order wire, individual voice channel format, direct digital format and bulk encoded multiple voice channel formats. The portion of the burst dedicated to bit error rate allows testing of the channel transmission by determining the quantity of bit errors.

Each of the sync bursts are identical in format, and a typical sync burst is illustrated also in FIG. 1. The first portion of the sync burst is, in common with the data burst, taken up for carrier recovery and bit timing recovery. The sync burst also includes a unique word (different from the data burst unique word), to identify the sync burst as such, as well as a station identification code to identify the station which is transmitting the sync burst.

The particular novel portion of the frame is the inclusion therein of a pair of sync bursts, a sync burst P or primary sync burst and a sync burst S or secondary sync burst. The manner in which these sync bursts are transmitted, received and utilized to maintain synchronization in the TDMA system is the invention to which this application is directed. In particular, the sync bursts S and P are transmitted by different stations. The primary or reference station transmits the P burst whereas the secondary station transmits the S burst. In normal operation the P burst is used by each of the other stations to derive precise reference for location of their respective data bursts. If, for any reason, the station fails to receive the P burst then the S burst is available to provide the necessary reference. When a number of stations agree that the P burst is lost another station can be selected, by manual means, to transmit a second sync burst. In this way the system is ensured of having at least a single sync burst in the frame at all times. This eliminates the need for automatic reference station replacement greatly reducing hardware complexity. Furthermore, it reduces the probability of network operation without a sync burst to the situation where both sync bursts fail simultaneously, an unlikely event.

Figure 2:
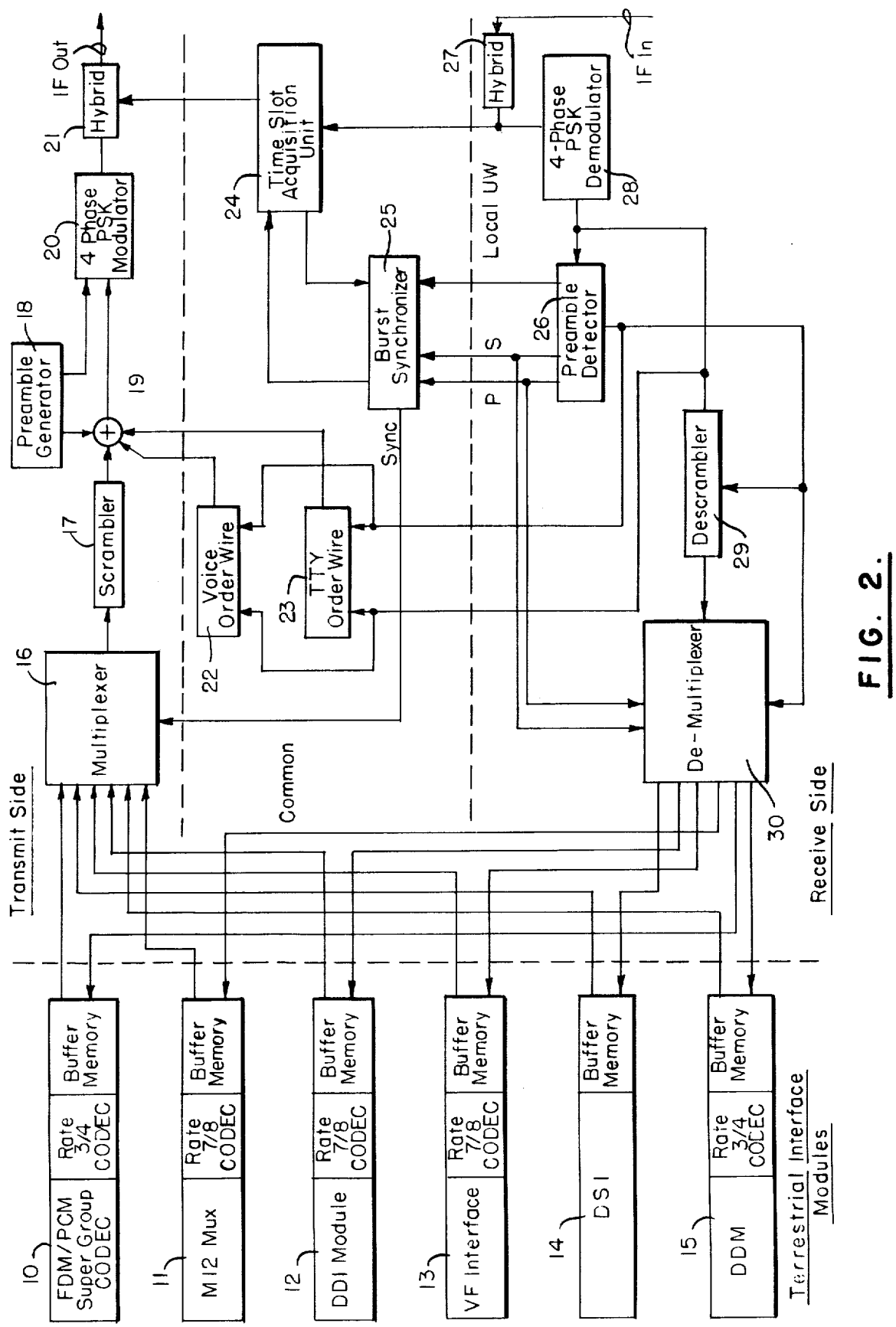
FIG. 2 is a block diagram of a station.

FIG. 2 illustrates, in block diagram form, a typical terrestrial terminal. The equipment in the terminal can be broken down into common equipment and a plurality of interface modules. The interface modules perform multiplexing/demultiplexing, PCM encoding/decoding and sub-burst compression/expansion functions in order to efficiently interface the available terrestrial signal forms (i.e., voice, data, super groups, etc.) with the common TDMA equipment. Each of the interface modules is designed as a stand alone attachment to the common equipment to provide maximum flexibility and economy in constructing the overall TDMA system. The types of interfaces needed in any one location can significantly differ from the types of interfaces needed at other locations. Accordingly, the interface modules for the two locations will usually be quite different. In addition, forward acting error correcting coding is employed with the capability of matching the particular error coding to both the data services as well as to the relation between the data service and the effectiveness of the uncoded terminal-satellite-terminal links.

In particular, each of the interface modules 10 through 15 interface with the common equipment through a multiplexer 16 and demultiplexer 30. The multiplexer 16 makes available to each of the interface modules 10-15 timing signals so that each interface may transmit its data to the multiplexer 16 at the proper time. The data from each of the different interfaces is referred to as a sub-burst. The common equipment receives the sub-bursts and combines them with the preamble to form a data burst. The demultiplexer 30 performs the inverse operation, that is it receives each of the sub-bursts and directs each sub-burst to its respective interface. Both the multiplexer 16 and demultiplexer 30 can operate with a variety of different interfaces and the interfaces shown in FIG. 2 are merely exemplary. Furthermore, in order to provide flexibility the multiplexer 16 and demultiplexer 30 can cooperate with different groups of interfaces, i.e., groups different than the ones shown in FIG. 2.

Burst synchronizer 25 operates to control the timing of each stations transmitter by providing a synchronization signal to the multiplexer 16. The multiplexer 16 serves to synchronize the preamble generator and at the appropriate time, allows data from each of the connected interfaces to reach the scrambler 17. When the preamble generator 18 is enabled, by a signal from the multiplexer 16, it begins generating the preamble. Referring now to FIG. 1 the preamble comprises six portions of the data burst including CR-BTR, UW, SIC, VOW, TTY, OW and BER. The preamble generator 18 generates a plurality of enabling signals and provides them to an OR gate 19 to enable each of the different components of the preamble to be made available to the modulator 20. At the conclusion of the preamble, multiplexer 16 allows the first data sub-burst to reach the scrambler 17. At the conclusion of that sub-burst another sub-burst is made available to the scrambler 17, and so on. Scrambler 17 is provided to reduce the power flux density transmitted when the information contains fixed data patterns. The scrambler 17, and corresponding descrambler 29 are known to those skilled in the art, therefore a detailed description thereof is not necessary. One typical manner of operating a scrambler 17 may be by employing modulo-2 addition of the digital data stream with a pseudo-random sequence. Thus, the location of any particular stations data burst, within the frame, is controlled by the burst synchronizer 25 providing the sync signal to enable the multiplexer 16 to begin transmission of the data burst. The burst synchronizer 25 has provided to it information from the time slot acquisition unit 24 which operates during initial acquisition in a manner well known to those skilled in the art. See for instance Maillet, U.S. Pat. No. 3,813,496. In addition, the burst synchronizer 25 receives timing information from the receiver at any station through the demodulator 28 and preamble detector 26. In particular, preamble detector 26 is capable of detecting both the primary and secondary sync bursts as well as the respective stations own data burst. Each of these bursts carries a unique word and the preamble detector 26 responds to the unique word in the P and S sync burst as well as to the unique word in the local stations data burst. This provides the synchronizer 25 with a reference from which to time its own data burst as well as with information regarding the positioning of the data burst with respect to its proper position. This latter information is used for fine control of the position of the data burst in the frame. One example of apparatus to provide this function is found in the Gabbard U.S. Pat. No. 3,562,432.

In order to more particularly explain the manner in which the inventive apparatus is constructed and operates, the preamble detector 26, preamble generator 18 and burst synchronizer 25 will be disclosed in detail in the following Figures.

Figure 3:
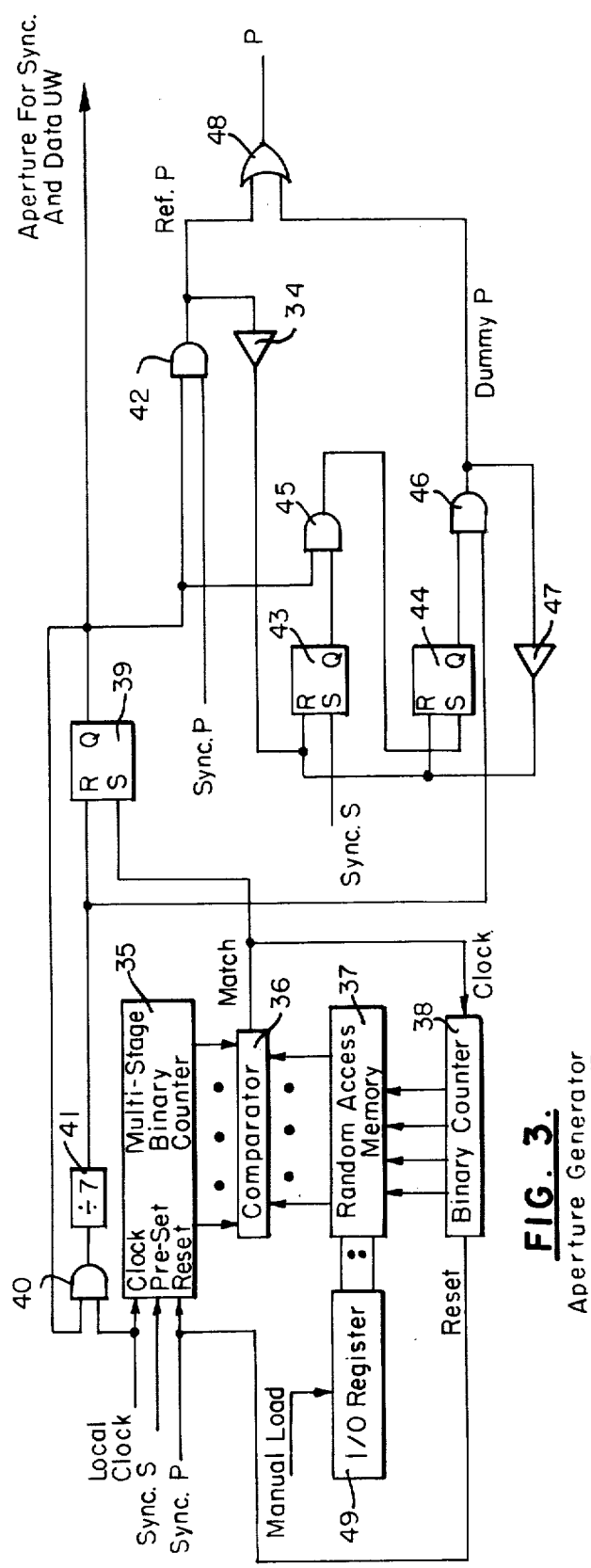
FIG. 3 is a block diagram of one embodiment of an aperture generator.

Before, however, discussing the detailed structure of these components it will be helpful for the reader to understand the manner in which both the secondary sync burst and primary reference sync burst are employed to ensure synchronization for any terminal. At this point we will assume that apparatus is provided in each station to allow it to transmit either the primary sync burst or the secondary sync burst and furthermore, that two different stations in the system have been selected to perform this function. Therefore, the frame (see FIG. 1) includes both sync bursts S and P. We will also assume that appropriate equipment is provided at each station for detecting both of these sync bursts and providing a signal at the proper time related thereto. We will refer to one signal as sync S for the signal produced by the secondary sync burst and another signal as sync P, generated by receipt of the primary reference sync burst. Referring now to FIG. 3, both of these signals are provided to a binary counter 35 which is driven by a local clock. Each station includes a local clock whose frequency of operation is nominally identical within some tolerance limit. The purpose of the synchronization system is to compensate for relative drift of the clocks. The outputs of the binary counter 35 are provided to a comparator 36. The other input to comparator 36 is provided by a random access memory 37. This memory may be manually loaded from I/O register 49. The random access memory is loaded to identify all the significant events in the frame with respect to the expected count of binary counter 35. The random access memory 37 is addressed by a counter 38. The reset input to this counter is provided by the sync P signal and the clocking input to the counter is provided by the output of the comparator called MATCH. Much of the apparatus illustrated in FIG. 3 is associated with an aperture generator. This aperture generator is designed to generate a signal for each of the different data bursts as well as for the primary sync bursts. Each of these events has a predetermined time of occurrence corresponding to a particular count of counter 35. If we assume for purposes of discussion that the primary sync burst is to occur at a count of zero each of the other events in the frame can be determined therefrom. Since as shown in the typical frame format, (in FIG. 1) the secondary sync burst occurs at some time prior to the primary or reference sync burst, the secondary sync burst will actually occur at some point prior to the counter 35 reaching a count of zero. Due to slight frequency differences between the different clocks in the different stations we can expect some drift in the unsynchronized operation of the counter. The sync S signal when detected in a particular station provides a presetting input to the binary counter 35 to preset it to the expected count of the counter on the occurrence of this signal. The reference or primary sync burst resets the counter to a count of zero. Those of ordinary skill in the art will understand that any selected count of the counter can be employed and the count of zero is merely exemplary.

In the normal operation, that is when both sync S and sync P are received the counter 35 in each station is synchronized to the counter in the station transmitting the primary reference burst through receipt of that reference burst. Since the station which is transmitting the secondary sync burst is synchronized to the station which is transmitting the primary sync burst the secondary sync burst will maintain a predetermined relation to the primary sync burst. However, under normal operations, that is when both sync bursts are received, that is not an essential requirement for effective operation. In fact, when the primary reference burst is received the receipt of the secondary sync burst is irrelevent. Thus the receipt of the primary sync burst is effective to synchronize the binary counter for proper operation.

The output of comparator 36, the MATCH signal also sets a flipflop 39. The Q output of flipflop 39 is connected as one input to AND gate 40 whose other input is provided by the local clock. The output of AND gate 40 feeds a divide by 7 circuit 41 which, when it produces an output, resets flipflop 39. The output of flipflop 39 is therefore a signal corresponding to 7 symbol times which is the aperture allowed for receipt of data unique words and sync unique words. The Q output of flipflop 39 is provided as one input to an AND gate 42 whose other input is the sync P signal. The output of AND gate 42 is connected to the reset input of flipflops 43 and 44 through buffer 34. The set input of flipflop 43 is provided as one input to an AND gate 45 whose other input is provided by the Q output of flipflop 39. The output of AND gate 45 is provided as the set input to flipflop 44 whose Q output is connected to one input to an AND gate 46 whose other input is provided by the output of divide by 7 circuit 41. Finally a buffer 47 connects the output of AND gate 46 to the reset inputs of flipflops 43 and 44. The output of AND gate 42 is the P signal and the output of AND gate 46 is the dummy P signal. Each of these are provided as an input to an OR gate 48 whose output is the P signal or primary sync signal for the burst synchronizer.

The aperture generator, which is the apparatus illustrated in FIG. 3, provides controls for two portions of the common equipment in any terminal. By generating signals, called apertures, the aperture generator improves the probabilities of unique word detection and helps identify the beginning of each burst for proper demultiplexing of the bursts received by the terminal. In additional to this function, however, the aperture generator also provides a synchronizing signal to the burst synchronizer. The burst synchronizer actually only requires the synchronizing signal periodically and normally, once every one third of a second. The counter 35 directly controls the production of different apertures for the receive timing. This counter is, of course, synchronized by both the sync S and sync P signals. Furthermore, those skilled in the art will understand that only a single one of these signals will be sufficient to synchronize this counter. The manner in which the counter operates is indifferent to which of these signals actually synchronizes the counter. However, the second function of the aperture generator, supplying the burst synchronizer with the sync P signal does depend on whether or not the sync P signal is actually received. Of course, whether or not the sync P signal is received the counter and its associated apparatus will still generate an aperture for this signal. However, if the signal is not received it cannot, obviously, be transmitted to the burst synchronizer. There are a number of ways in which synchronization can be maintained in the absence of the sync P signal. In one of these implementations, which is illustrated in FIG. 3, a dummy P signal is generated if, at the conclusion of the aperture of the sync P signal has not been received. This dummy P signal is then passed on to the burst synchronizer as if it were actually the sync P signal itself.

In another embodiment of this invention when loss of the sync P signal is detected the aperture generator transmits the sync S signal to the burst synchronizer in place of the sync P signal. In this embodiment some modification must be made to the burst synchronizer for the following reason. The burst synchronizer operates only with prior knowledge of the delay, between the synchronizing signal it receives and the station's own data burst transmission. More particularly, the station's own data burst transmission is detected by detecting the station's unique word (otherwise referred to as local unique word). The burst synchronizer operates on the delay between these two signals. Obviously, to maintain proper synchronization when passing the sync S signal to the burst synchronizer, instead of the sync P signal, the delay will also have to change to compensate for the difference in time between the occurrence of the sync S and sync P signals. This second embodiment of the invention is disclosed with reference to FIGS. 7 and 8.

We now continue to describe a first embodiment of the invention which is illustrated in FIG. 3, when taken in conjunction with FIGS. 2 and 4–6. In this embodiment, by reason of the logic employed occurrence of the secondary sync burst is not considered an event whose count is stored in the random access memory 37. As a result the comparator 36 will not produce a MATCH and thus no aperture is produced for the secondary sync burst. As noted above the random access memory stores the expected count of a counter 35 to define significant events in the frame such as the occurrence of the sync P signal and the occurrence of each data burst unique word signal. Since the clocks at different stations may drift with respect to one another an aperture is generated during which the expected signal may be received. The beginning of the aperture may actually be prior to the nominal or expected time of any particular event. For instance, therefore, the random access memory may store a count slightly before the expected count of counter 35 on the receipt of the sync P signal. When this count is reached a MATCH output will be provided by comparator 36. This signal sets the flipflop 39 whose output enables AND gate 40 to pass clock pulses to the divider 41. Thus, for the 7 symbol time which divider 41 is running flipflop 39 provides an aperture. This enables gate 42 to pass the sync P pulse when that is received generating the P signal. The reference P pulse is coupled, through OR gate 48 to the burst synchronizer for synchronization purposes. The P signal also resets flipflops 43 and 44.

If, for some reason, the sync P pulse is not received the following operation will occur. The sync S signal, in addition to presetting counter 35 (and therefore synchronizing it) will also set flipflop 43. When the aperture is initiated by counter 35 reaching the count at which sync P is expected and setting flipflop 39, AND gate 45 (which is enabled by the set condition of flipflop 43) sets flipflop 44. The output of flipflop 44 provides one input to AND gate 46 and, when the divide by 7 circuit 41 produces an output AND gate 46 is enabled to pass a dummy P pulse. This has the effect of, through buffer 47, resetting both flipflops 43 and 44 and also, through OR gate 48 passing a P signal for synchronization purposes to the burst synchronizer.

Thus, even in the absence of the primary sync burst a synchronization signal is provided to the burst synchronizer which is displaced no more than ± 3 symbol times from the theoretical correct time of receipt. However, more important than the production of the dummy reference signal is the fact that the apparatus which generates this dummy reference signal is indeed still synchronized through operation of the secondary sync pulse controlling the status of the binary counter 35.

Figure 4:
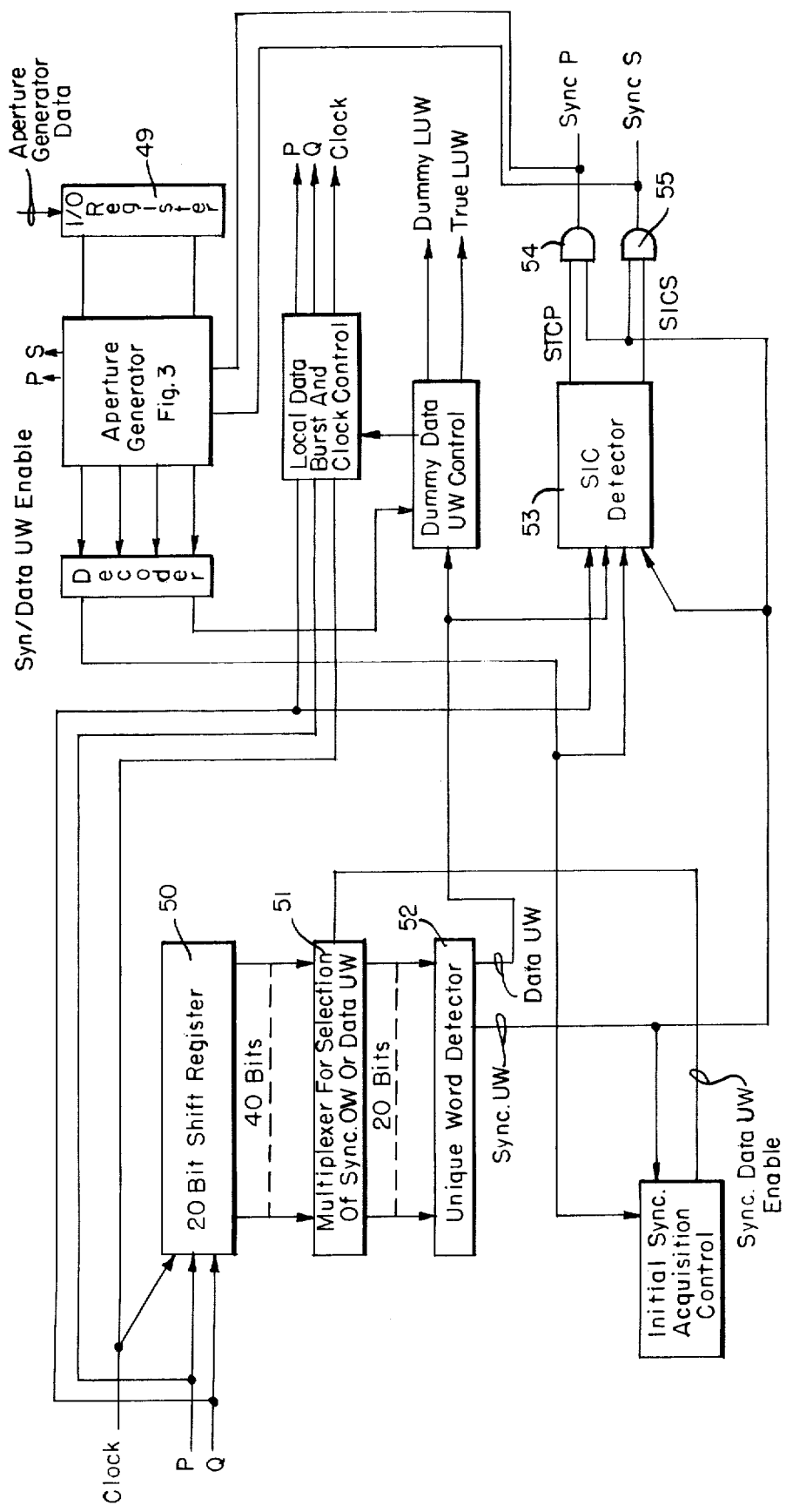
FIG. 4 is a block diagram of a preamble detector.

In order to illustrate the manner in which the sync S and sync P signals are generated by the preamble detector we can now refer to FIG. 4 which illustrates a block diagram of a preamble detector. Referring to FIG. 2, briefly, will illustrate that the preamble detector 26 receives the demodulated signal received from the satellite. Since this is four-phase PSK we have two pulse trains, P and Q which are provided to a 20 bit shift register 50. Shift register 50 is connected to multiplexer 51 for providing signals indicating a synchronization unique word or a data unique word to a unique word detector 52. Since a unique word comprises a particular pulse pattern those of ordinary skill in the art will understand the manner in which such a unique word detector 52 can be implemented. An example of a unique word detector 52 which could be used in this system is illustrated in Kaul et al U.S. Pat. No. 3,796,868. Unique word detector 52 provides signals indicative of either a data unique word or a sync unique word. The sync unique word signal, which is produced when a sync unique word is detected, is provided to SIC (station indentification code) detector 53 as well as to a pair of AND gates 54 and 55. The SIC detector 53 has provided to it identification of the SIC codes identifying either the reference station or the station transmitting the secondary sync burst. The Q input is provided to the SIC detector 53 so that it may detect the SIC code for either of these stations. SIC detector 53 provides SICP or SICS outputs indicative of detection of the station identification code for the station transmitting the primary sync burst or the secondary sync burst, respectively. These signals are provided to AND gates 54 and 55. Upon the simultaneous occurrence of a sync unique word signal and a SICP signal AND gate 54 provides the sync P signal and, correspondingly, upon simultaneous presence of the sync unique word signal and SICS signal, AND gate 55 produces the sync S signal. These signals are then provided as inputs to the counter 35 (see FIG. 3).

Before describing the preamble generator which not only generates the preamble for each station data unique word but which also generates the synchronization burst if the station is either the primary or secondary synchronization station a brief reference will be made to the burst synchronizer, and the manner in which the burst synchronizer employs the output signal of the aperture generator (FIG. 3) to maintain synchronization. This discussion will be brief since burst synchronizers are known per se, see for example the aforementioned Gabbard U.S. Pat. No. 3,562,432.

Figure 5:
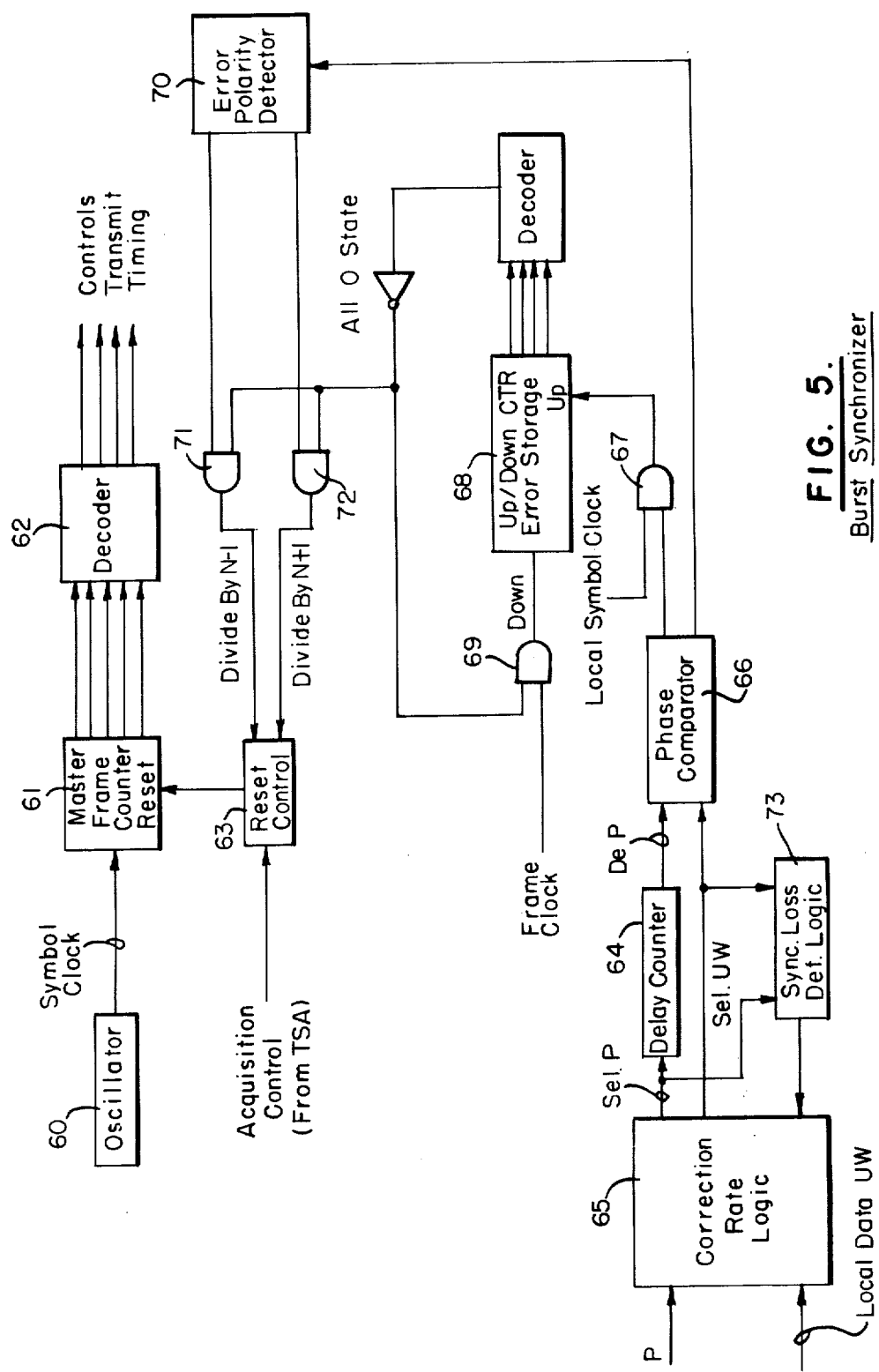
FIG. 5 is a block diagram of one embodiment of a burst synchronizer.

FIG. 5 illustrates the burst synchronizer. More particularly, oscillator 60 generates timing signals for a master frame counter 61. Frame counter 61 is capable of counting up to the number of symbols, N, included in a frame. However, the counter can be controlled by reset control 63 to divide by either N plus 1, and/or N minus 1 for reasons which will appear hereinafter. Each decade of the frame counter is fully decimally decoded by decoder 62. By using multiple input AND gates, time ticks are generated for any symbol time during the frame. For example, if an AND gate has provided to it signals representative of a decoded 5 from the thousands decade, decoded 2 from the hundreds decade, decoded 1 from the tens decade and decoded 8 from the units decade a pulse will be produced at the output of the AND gate which is one symbol wide and will correspond to symbol 5218 in the frame. To create a window or a gate two such time ticks drive set and reset inputs of a flipflop. With this technique all major time control pulses, gates and functions required on the transmit side of the TDMA equipment can be generated. Burst synchronizer also provides control signals to the multiplexer (see FIG. 2) represented by the sync input to the multiplexer 16.

In order to maintain normal or steady state burst synchronization the desired position of a burst is, of course, known and preloaded into a delay counter 64. At predetermined intervals, such as one third of a second, the P signal (provided by the aperture generator of FIG. 3) is selected and gated by the correction rate logic 65 to begin down counting the delay counter 64. When the delay counter reaches zero a pulse called the delayed P pulse is developed. In the same frame, the detected local unique word, that is the unique word transmitted by the station in which the apparatus being described is located, is also selected and compared in time by the comparator 66 with the arrival of the delayed P pulse. If the two pulses arrive simultaneously the local burst is in the correct frame position. If the two pulses arrive at different times the magnitude and polarity of the differences is measured and stored in units of symbols. More particularly, an AND gate 67 is gated on by the arrival of one of the two pulses at the comparator 66 and gated off by the arrival of the second. During the time that the AND gate 67 is enabled and up/down counter 68 counts the number of local symbol clock pulses produced in the interval. The local burst is then moved to its correct position in the frame by forcing the frame counter to divide by N plus 1 or N minus 1 for a number of symbols representing the phase difference between the delayed P signal and the local burst. Thus, for each frame in which the frame counter divides by a quantity other than N, then AND gate 69 decrements the up/down counter error storage unit 68 down by a single count. Whether or not the frame counter divided by N minus 1 or N plus 1 is determined by error polarity detector 70 gating on either AND gates 71 or 72 depending upon whether the P signal or local unique word signal arrived at the phase comparator 66 first.

Typically, the relationship between the P signal and the local unique word is measured every one third of a second which is controlled by the round trip delay to the satellite.

Figure 6A:
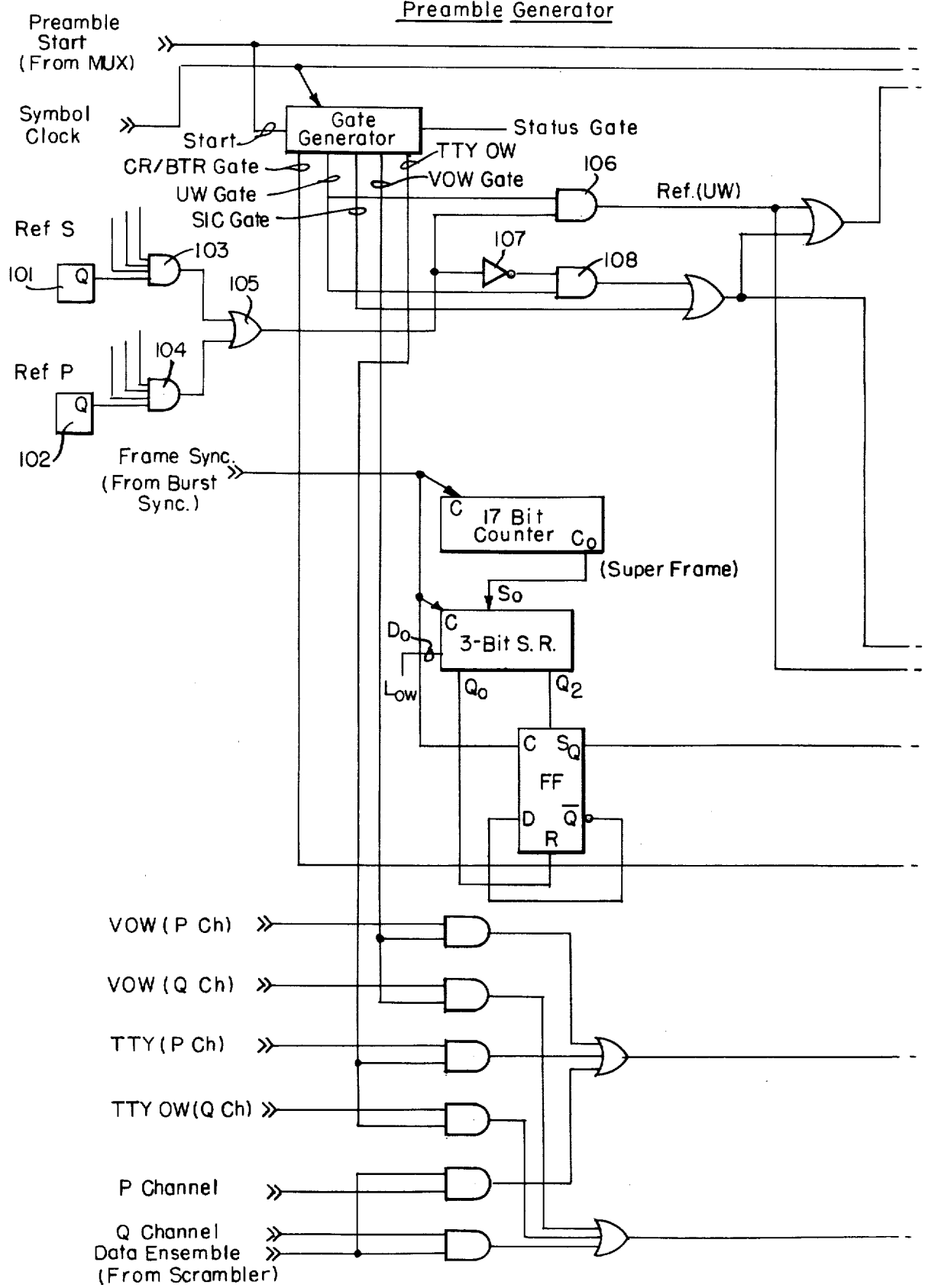
FIGS. 6A and 6B are a block diagram of a preamble generator.
Figure 6B:
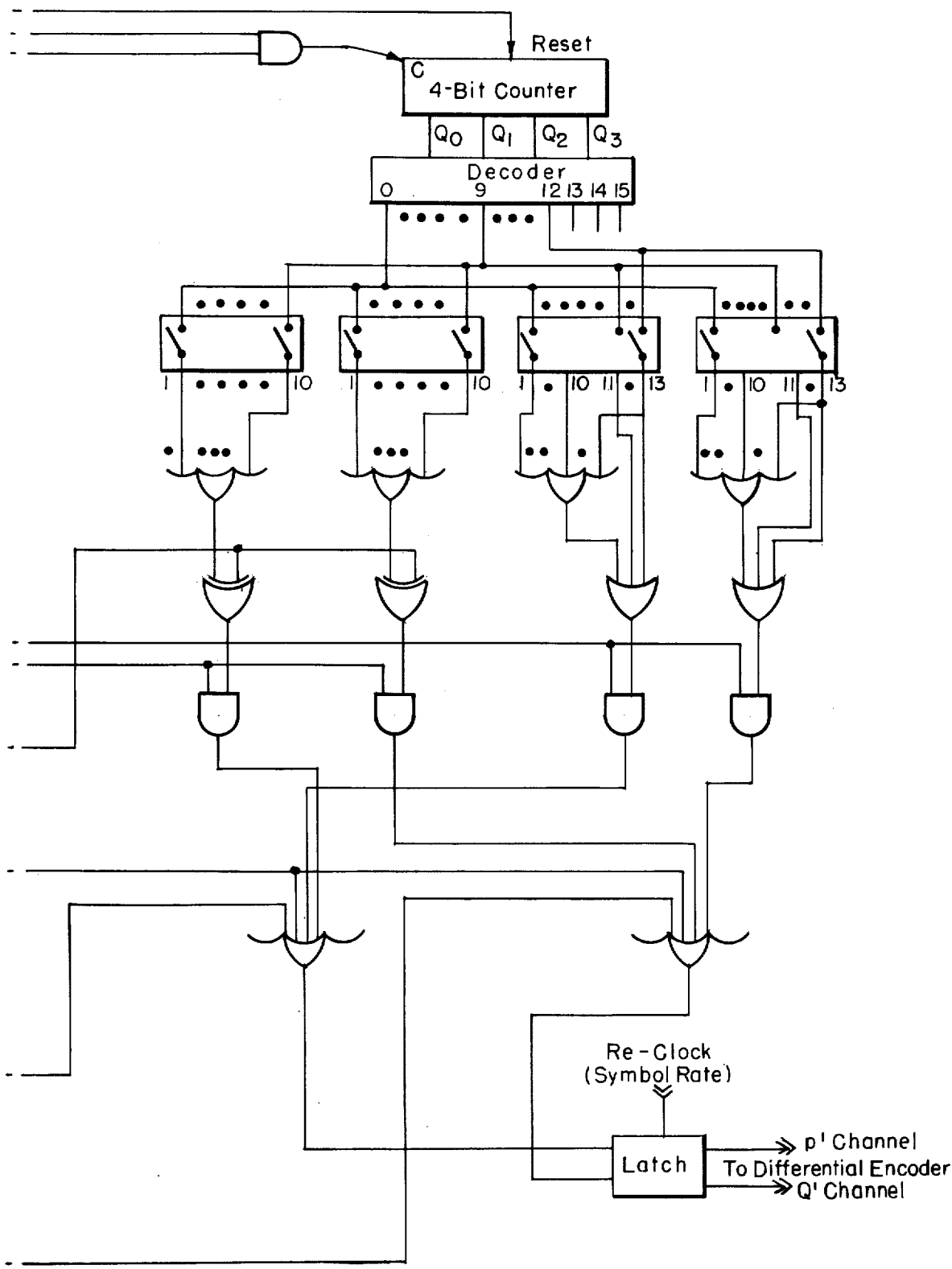

FIG. 6 illustrates the preamble generator which provides the preamble at each station for that stations data burst and also provides for the synchronization burst from either the reference or secondary sync burst transmitting station.

The preamble start command from multiplexer 16 initiates a decoded counter which generates the various gating functions required for data combining. During the carrier recovery and bit timing recovery portion of the premable a gate (CR/BTR gate) enables the sequence of ones for both P and Q channels. A four bit counter, which had been reset by the preamble start signal, is then gated on. Tapping the desired decoded outputs with changeable jumpers selectors generates the unique word and station identification code sequences. Two different unique words are generated by means of two sets of tapping; one is the data burst unique word the other is the reference burst unique word, which is enabled only if the station is one of the assigned reference stations.

More particularly, a secondary reference station flipflop 101 is set only at the station which is the secondary sync burst transmitting station. Correspondingly, a primary reference station flipflop 102 is set only at the station which is the primary sync burst transmitting station. The outputs of these flipflops are fed respectively to AND gates 103 and 104. The other inputs to AND gates 103 are the decoded outputs from the frame counter 61 (see FIG. 5) which identify the time during which the secondary sync burst is to be transmitted. Correspondingly, the other inputs to AND gate 104 are outputs of the decoder 62 of the burst synchronizer (see FIG. 5) which define the time when the primary sync burst is to be transmitted. The outputs of AND gates 103 and 104 are fed to an OR gate 105. The output of OR gate 105 is provided to an AND gate 106 and to an inverter 107. When this output is present it enables AND gate 106 to pass the unique word gate to the four bit counter mentioned above. At the same time, the output of inverter 107 inhibits AND gate 108 from passing this unique word gate. The output of AND gate 106 thus is present to enable transmission of either the primary or the secondary sync burst. Correspondingly, the output of AND gate 108 is present to enable transmission of the unique word associated with that stations data burst.

Thus, the foregoing portions of the specification have described in the manner in which both a primary and a secondary sync burst can be transmitted from a particular station. Of course only one of these bursts would be transmitted from any one station and there would only be two stations in the system which are transmitting a synchronizing burst. In addition, we have indicated the manner in which the preamble detector detects the presence of either the primary or the secondary sync bursts and makes that signal available to the aperture generator. We have further described the manner in which the aperture generator, and more particularly the counter located therein, is synchronized by the presence of both the secondary and primary sync bursts in the frame and the manner in which the aperture generator controls the burst synchronizer to control the transmit timing of any particular station. It should be apparent to those of ordinary skill in the art that the presence of the secondary sync burst allows the station to remain synchronized even in the absence of reception of the primary sync burst. With this flexibility, then, when the station transmitting the primary sync burst is incapacitated, the TDMA synchronization apparatus will operate properly in the absence of the primary sync burst and, the station transmitting the secondary sync burst will automatically become the synchronizing station for the system. When the absence of the primary sync burst is confirmed, which can occur by manual means, a second station can be selected for transmitting another sync burst and that sync burst initiated by enabling the proper flipflop, such as 101 or 102 (see FIG. 6).

We have previously mentioned that in another embodiment of the invention the apparatus does not produce the dummy P signal and instead the sync S signal is transmitted to the burst synchronizer for synchronization purposes. As was previously mentioned, the delay counted by the burst synchronizer must be changed when employing the sync S signal, rather than the sync P signal, to compensate for the difference in the times of occurrence of these two signals. In this embodiment, furthermore, the sync S signal is considered an event whose occurrence is stored in the random access memory. As a result, comparator 36 will produce the MATCH output at the expected time of receipt of the sync S signal or when counter 35 reaches the count at which the sync S signal is expected.

Figure 7:
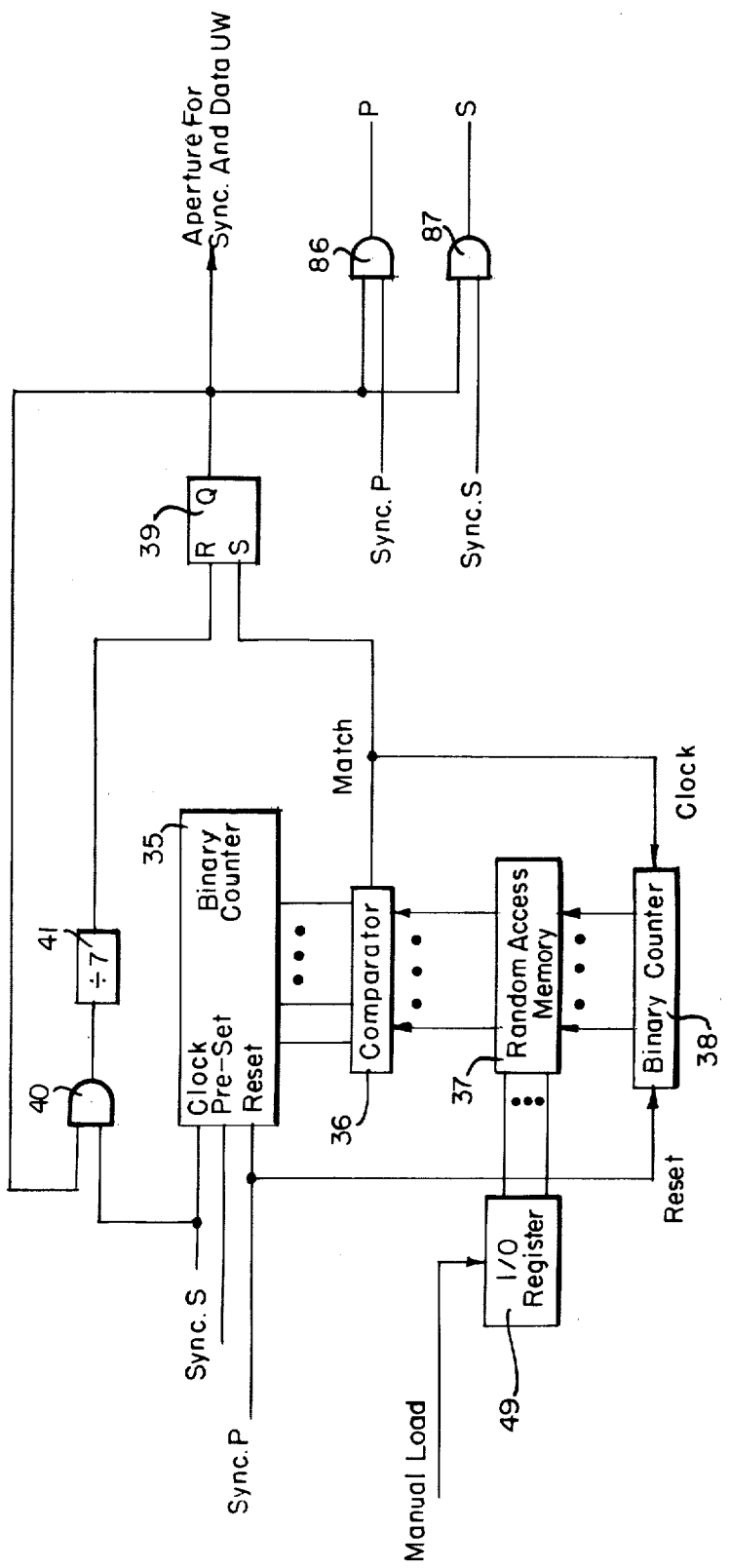
FIG. 7 is a block diagram of another embodiment of an aperture generator.

In this embodiment the aperture generator takes the form shown in FIG. 7, rather than the one illustrated in FIG. 3. Actually, a majority of the apparatus in FIG. 7 finds correspondence in the illustration of FIG. 3 except for the gates 86 and 87. In this embodiment, in addition, the burst synchronizer (FIG. 5) takes the form illustrated in FIG. 8 in which a majority of the apparatus in FIG. 8 finds correspondence with that disclosed in FIG. 5.

Referring first to the aperture generator, it will be noticed that the logic required for generating the dummy P signal has been removed. In addition, the random access memory now stores the expected count at which the sync S signal is received and thus the comparator will produce a MATCH on that occurrence. In addition, a pair of AND gates 86 and 87 are provided which have as one input the sync P and sync S signals, respectively, the other input to each of these AND gates is provided by the aperture generated by the Q output of flipflop 39. These gates then produce the S and P signals for transmission to the burst synchronizer. Under normal operation, that is when both the sync P and sync S signals are received, gates 86 and 87 will produce the P and S signals, respectively. Referring now to FIG. 8 the additional apparatus shown there (and not shown in FIG. 5) includes a modified delay counter unit 88 and a gate 85. The modified delay counter unit 88 is provided with the signal from sync loss logic 73. This unit merely detects the absence of the P signal. If desired this unit can respond to the absence of a single primary synchronizing burst. On the other hand, since the correction rate logic selects a P signal for transmission to the burst synchronizer approximately every one third of a second and, such correction is not necessary more than once per second, the sync loss detection logic can count up to the loss of three primary synchronizing burst before it goes into operation. When the sync loss detection logic detects the absence of the required number of primary synchronizing bursts it provides a signal to the modified delay counter unit 88 and an input to AND gate 85. The modified delay counter unit 88 merely adds, to the delay counter 64 delay equal to that existing between the primary and secondary synchronizing bursts. At the same time, upon the production of the S synchronizing signal, AND gate 85 will pass the signal through the correction rate logic to the delay counter. Thus, the burst synchronizer has now synchronized the terminal to the secondary synchronizing burst. Inverter 89 and AND gate 90 cooperate to prevent the P signal from reaching the correction rate logic in the event that the primary synchronizing burst again reappears.

Thus, in the apparatus as modified by the illustrations in FIGS. 7 and 8, instead of producing a dummy P signal, the S signal is employed by the burst synchronizer to maintain synchronization of the terminal. If the station which is transmitting the secondary synchronizing burst is receiving the primary synchronizing burst then it will act, in effect, as a relay, to maintain synchronization of the entire system. On the other hand, if the station transmitting the secondary synchronizing burst is also not receiving the primary synchronizing burst the station will now become the master station. As such, the burst synchronizer at that station will be disabled by the sync loss detection logic acting in concert with the apparatus which provides for transmission of the secondary sync burst.

What is claimed is:

1. Synchronization apparatus for a TDMA communication system for maintaining synchronization regardless of failure of a synchronizing burst transmitted by the reference station, said TDMA communication system having a number of stations communicating with each other in a TDMA mode through a communication link, said synchronization apparatus comprising, means for periodically transmitting a primary synchronization burst, means for periodically transmitting a secondary synchronization burst in at least each frame including a primary synchronizing burst, detecting means at a plurality of said stations for detecting both said synchronization bursts, a burst synchronizer at each of said plurality of stations for maintaining transmission bursts of said station within a pre-assigned time slot, and means at said plurality of stations responsive to said detecting means for controlling said burst synchronizer to maintain synchronization even in the absence of said primary synchronization burst.

2. The apparatus of claim 1 in which said means responsive to said dtecting means includes counting means, and a clock driving said counting means, said counting means responsive to both said primary synchronization burst and said secondary synchronization burst.

3. The apparatus of claim 2 in which said counting means is preset by said secondary synchronization burst and is reset by said primary synchronization burst.

4. The apparatus of claim 3 in which the period of said primary synchronization burst is equal to the period of said secondary synchronization burst.

5. The apparatus of claim 4 which further includes storage means having stored therein the expected state of said counting means at the time of receipt of said primary synchronizing burst, comparator means connected between said storage means and said counting means to indicate when the state of said counting means reaches the count stored in said storage means and logic means responsive to the output of said comparator means and to the presence of said primary synchronizing burst for producing a synchronizing signal for operation of said burst synchronizer.

6. The apparatus of claim 5 wherein said logic means produces a dummy synchronizing signal in the absence of reception of said primary synchronizing burst.

7. The apparatus of claim 6 which further includes additional means responsive to comparator means for generating an aperture during which said primary synchronizing burst is expected to be received.

8. The apparatus of claim 7 wherein said logic means includes gate means partially enabled by generation of said aperture to pass said primary synchronizing burst to said burst synchronizer when said primary synchronization burst is received.

9. The apparatus of claim 8 in which said logic means further includes bistable means responsive to receipt of said secondary synchronizing burst and to the termination of said aperture in the absence of receipt of said primary synchronizing burst for producing said dummy synchronizing signal for transmission to said burst synchronizer.

10. The apparatus of claim 5 in which said burst synchronizer includes delay counting means and a sync loss detection logic, means responsive to operation of said sync loss detection logic for adjusting said delay counting means and for enabling said burst synchronizer to respond to said secondary synchronization burst.

11. The apparatus of claim 10 in which said last named means adjusts said delay counting means by an amount representing the delay between said secondary synchronization burst and said primary synchronization burst.

12. A method of synchronizing a number of stations in a TDMA system for maintaining synchronization in the absence of a primary syncronization burst, said stations communicating with each other through a communication link and in which the communication cycle comprises a repetitive frame including a primary synchronizing burst, the improvement comprising steps of:

a. transmitting, for reception by said stations a secondary synchronization burst within said frame, b. synchronizing, at each of said stations to said primary synchronization burst, and c. synchronizing with said secondary synchronization burst in the absence of said primary synchronization burst.

13. The method of claim 12 in which said step (b) includes the further steps of:

i. operating a counter at a clock rate nominally the same for a number of said primary stations, ii. receiving said synchronization burst, iii. resetting said counter by reception of said primary synchronization burst, and iv. controlling said station by the state of said counter.

14. The method of claim 13 in which said step (c) includes the further steps of:

i. receiving said secondary synchronization burst, ii. presetting said counter by reception of said secondary synchronization burst and iii. controlling said station by the state of said counter.

15. The method of claim 12 in which said step (c) includes the steps of:

i. detecting absence of said primary synchronization burst ii. producing a dummy synchronization signal, and iii. synchronizing to said dummy synchronization signal.

16. The method of claim 12 in which said step (c) includes the steps of:

i. detecting absence of said primary synchronization burst, ii. providing said secondary synchronization burst to a synchronization unit, and iii. adjusting said synchronization unit for proper synchronization with said secondary synchronization burst.

17. Synchronization apparatus for a TDMA communication system including a plurality of stations for maintaining synchronization regardless of the failure of the synchronizing burst transmitted by the reference station including:

means at one of said stations for periodically transmitting a secondary synchronization burst in at least each frame including the reference station synchronizing burst, detecting means at at least one of said stations for detecting both said synchronization bursts, a burst synchronizer at at least said one station for maintaining transmission bursts of said one station within a preassigned time slot, and means at at least one said station responsive to said detecting means for controlling said burst synchronizer to maintain synchronization even in the absence of said reference station's synchronization burst.

18. The apparatus of claim 17 in which said means responsive to said detecting means includes counting means, and a clock driving said counting means, said counting means responsive to both said secondary synchronization burst and to said synchronization burst from said reference station.

19. The apparatus of claim 18 in which said counting means is preset by said secondary synchronization burst and is reset by the synchronization burst from said reference station.

20. The apparatus of claim 19 which further includes storage means having stored therein the expected state of said counting means at time of receipt of the synchronizing burst from said reference station, comparator means connected between said storage means and said counting means to indicate when the state of said counting means reaches the count stored in said storage means and logic means responsive to the output of said comparator means and to the presence of said synchronizing burst from the reference station for producing a synchronizing signal for operation of said burst synchronizer.

21. The apparatus of claim 20 wherein said logic means produces a dummy synchronizing signal in the absence of reception of the synchronizing burst from the reference station.

22. The apparatus of claim 21 which further includes additional means responsive to comparator means for generating an aperture during which said synchronizing burst from the reference station is expected to be received.

23. The apparatus of claim 22 wherein said logic means includes gate means partially enabled by generation of said aperture to pass the synchronizing burst from said reference station to said burst synchronizer when the synchronization burst from the reference station is received.

24. The apparatus of claim 23 in which said logic means further includes bistable means responsive to receipt of said secondary synchronizing burst and to the termination of said aperture in the absence of receipt of the synchronizing bursts from the reference station for producing said dummy synchronizing signal for transmission to said burst synchronizer.

25. The apparatus of claim 17, in which said burst synchronizer includes delay counting means and a sync-loss detection logic, means responsive to operation of said sync-loss detection logic for adjusting said delay counting means and for enabling said burst synchronizer to respond to said secondary synchronization burst.

26. The apparatus of claim 25 in which said last-named means adjusts the delay counting means by an amount representing the delay between said secondary synchronization burst and the synchronization burst from said reference station.

* * * * *